United States Patent
Dobberpuhl et al.

(10) Patent No.: US 7,103,652 B1
(45) Date of Patent: Sep. 5, 2006

(54) AMBIGUITY-PURGING AND TEMPLATE-CONFLICT-RESOLUTION IN COMPUTER NETWORK EVENTS-NOTIFICATION

(75) Inventors: Walter T. Dobberpuhl, Milford, MA (US); Andreas L. Bauer, Maynard, MA (US); Ying Xie, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 911 days.

(21) Appl. No.: 09/746,090

(22) Filed: Dec. 23, 2000

(51) Int. Cl.
*G06F 15/173* (2006.01)

(52) U.S. Cl. .................. 709/223; 709/224; 709/227

(58) Field of Classification Search ........ 709/223–227, 709/203, 217–219; 707/10
See application file for complete search history.

(56) References Cited

U.S. PATENT DOCUMENTS

| | | | |
|---|---|---|---|
| 5,621,892 A * | 4/1997 | Cook | 709/224 |
| 6,185,613 B1 * | 2/2001 | Lawson et al. | 709/224 |
| 6,230,160 B1 * | 5/2001 | Chan et al. | 707/103 X |
| 6,349,333 B1 * | 2/2002 | Panikatt et al. | 709/223 |
| 6,356,282 B1 * | 3/2002 | Roytman et al. | 715/736 |
| 6,377,973 B1 * | 4/2002 | Gideon | 709/203 |
| 6,466,937 B1 * | 10/2002 | Fascenda | 707/10 |
| 6,560,604 B1 * | 5/2003 | Fascenda | 707/10 |
| 6,859,829 B1 * | 2/2005 | Parupudi et al. | 709/224 |
| 2002/0069246 A1 * | 6/2002 | Gideon | 709/203 |
| 2002/0128897 A1 * | 9/2002 | Nelson et al. | 705/10 |
| 2003/0046291 A1 * | 3/2003 | Fascenda | 707/10 |

* cited by examiner

*Primary Examiner*—Ario Etienne
*Assistant Examiner*—LaShonda Jacobs
(74) *Attorney, Agent, or Firm*—Krishnendu Gupta; Robert Kevin Perkins (57) ABSTRACT

There is disclosed an improvement to a system, apparatus, method, and computer program product relating to a novel events-notification activity occurring within computer network environments including SAN, NAS and client server environments. A user at a convenient, single user-interface location in a network is enabled to establish such activity by creating and deploying template software objects which are configurable with respect to both events of interest and genre of notifications of such events. Accordingly, such user, operating at the user-interface at a client or head-end station and employing such templates, can select: (1) which particular network-failure events (from complete failures to measured degradations), such as those occurring in peripherals including disk array storage devices, are to be reported; (2) to whom such events shall be reported, worldwide; and, (3) the mode of communication by which such events shall be reported such as email, telephone, pager, etc. In those instances where certain databases in storage devices of servers employed throughout the network may contain templates which present name/content conflicts with client database templates the events-notification activity is less effective than it otherwise would be. There is disclosed a system, apparatus, method, and computer program product for handling such conflicts and thereby enhancing the effectiveness of the events-notification activity. An alternative embodiment of this solution handles the scenario where multiple networks having multiple clients sharing particular servers create template name/content conflicts.

12 Claims, 8 Drawing Sheets

AMBIGUITY-PURGING AND TEMPLATE-CONFLICT-RESOLUTION IN COMPUTER NETWORK EVENTS-NOTIFICATION

CROSS REFERENCE TO RELATED APPLICATIONS

This application relates to another application filed of even date herewith, with common assignee, and entitled: "Computer Network Events-Notification System, Apparatus and Method under User Control".

FIELD OF THE INVENTION

The present invention generally relates to a computer network events-notification system, apparatus and method, and, more particularly, relates to device management software under user control at a client or head-end station which manages the monitoring and reporting-on of events throughout the network.

BACKGROUND OF THE INVENTION

Computer networks are pervasive in our society and virtually all human activity is now influenced at least to some extent by existence and usage of these networks. Therefore, the more reliable these networks are, the better for all concerned. Accordingly, substantial effort is being invested in improving reliability and long-term operability of these networks. One current approach to improving computer network reliability is to continuously monitor events or operating states of peripheral devices on an individual basis in the network to determine if those states reflect normal or failing peripheral-device operation. Each peripheral device or group thereof has its own individually dedicated server for performing at least that monitoring function. If such monitoring allows for sufficiently early notification of an event such as a failing device or portion thereof, (e.g., in a disk drive peripheral, failure-events such as cooling-fan failure, bad fuse, ac power failure, invalid data sector read, checksum error, inconsistent time stamps, incoherent stripe, etc. can occur), then action can be undertaken in an attempt to avoid or mitigate effects of the particular failure mechanism(s) involved. Accordingly, overall system or network reliability is generally enhanced by such timely event-notification and response thereto. But, setting-up the notification system on an individual basis, and monitoring and reporting events on an individual basis is problematic as discussed further below.

Typically, in the aforementioned prior art, operating states of hardware peripheral devices, such as, for example, disk drives, are monitored and software is utilized as the avenue by which such monitoring is performed. Distributed management software running in client server networks is available now for these purposes. In this prior art, as noted, a server-host computer is normally associated with, or dedicated to, a group of peripherals including disk drives and is tasked with monitoring events (such as failures) associated with those peripherals and reporting such events to its client. However, since each such group of peripherals has its own server for that purpose, each such server operates in this events notification arena independently of all other servers in the network. Thus, there is a one-to-one relationship between any disk array and the server computer monitoring it. This arrangement necessitates the programming and set-up of each such server on an individual basis to monitor a particular peripheral or group of peripherals. In other words, in the prior art, methodology for handling this peripheral device state information, or system event configuration information, involves a manual set-up on a per-host basis (one server at a time). This set-up is accomplished by editing a text-based configuration file which is very time consuming and error-prone. And this arrangement offers further complexity if changes or upgrades are required: for example, if a new computer network service person hires-on with a new pager number, it is a non-trivial challenge to travel to each separate storage system on a network of, for example, a thousand or more disk drive peripherals scattered geographically around the nation (or, even worse, around the globe) in order to properly upgrade the pager number for each peripheral device cluster. Additional challenge is presented in the events-notification arena by pre-existing network state conditions wherein portions of a client's database contain data in conflict with other data contained in portions of one or more of its servers' databases. These complexities, limitations and challenges of the prior art are addressed and overcome while further enhancing reliability of network operation, by the welcome arrival of the present invention.

SUMMARY OF THE INVENTION

In certain embodiments of the present invention which avoid the aforementioned prior-art one-to-one relationship between server and peripheral cluster in the event-notification arena, control over all event notification activity in the network is placed with the network's user at a single point in the network by virtue of novel improvements made to existing distributed management software. In these embodiments, system, apparatus, method or computer program product is provided to enable the client to permit the network user to establish an events-notification system wherein template software objects of event-errors of interest are created at the user interface and deployed to the servers' databases, while at the same time ensuring that any pre-existing server-database template objects and identically-named client template objects contain identical object data. Such template software objects, created and deployed as noted, and ensuring unambiguity as noted, are also compatible with and useable in Storage Area Network (SAN) and Network Attached Storage (NAS) environments.

In further features of these embodiments of the present invention, either a system including its sub-system components, apparatus, method, or computer program product including programmable code, is provided to enable the client to permit the user to retrieve any pre-existing server-database template objects and compare their names with those stored in the client-database, add new templates to the client database comprised of pre-existing object data from any pre-existing template objects with names that do not match client template object names, and resolve any conflict between any pre-existing server-database template objects and any client template objects having identical names but having different data.

In yet another feature of these embodiments of the present invention, the client permits the user to resolve such conflict by either deleting conflicting server-stored template objects, renaming server-stored template objects, updating server-stored template objects, or taking other action to resolve the conflict.

In still another feature of the present invention, purging ambiguity between a client or primary template object and any pre-existing server-location or network-remote template objects involves apparatus, methodology, computer program product or a system for permitting the client to retrieve pre-existing server-location template objects, compare names of each of the pre-existing objects with all names in the client template-object, add pre-existing template object data to the client template object from pre-existing server objects having names that do not match client template object names, compare pre-existing contents of pre-existing server objects with other contents of the client template object for client and server objects having the same name and to purge ambiguity if the compared contents are different.

In an alternative embodiment of the present invention, an events notification system deployed across multiple client-server networks, under the conditions of a client from one network being operatively coupled to a server of a different network, updates templates on the different-network server to conform to otherwise conflicting templates on the client from the one network. And the different-network client updates the templates in its database to conform to the updated templates in the different network server.

It is thus advantageous to use the present invention to improve reliability of computer networks utilizing network-distributed event-notification techniques without encountering the complexities, inconveniences and shortcomings of the prior art approaches to reliability enhancement.

It is therefore a general object of the present invention to provide improved computer networks.

It is another object of the present invention to provide improved client-server computer networks, including those operating within SAN (Storage Area Network) and/or NAS (Network Attached Storage) environments, with enhanced reliability due to utilizing network-distributed event-notification techniques that can purge ambiguity in, and resolve conflicts between, conflicting databases located respectively on the client and on its server(s).

Other objects and advantages will be understood after referring to the detailed description of the preferred embodiments and to the appended drawings wherein:

DESCRIPTION OF THE PREFERRED
EMBODIMENTS

Figure 1:
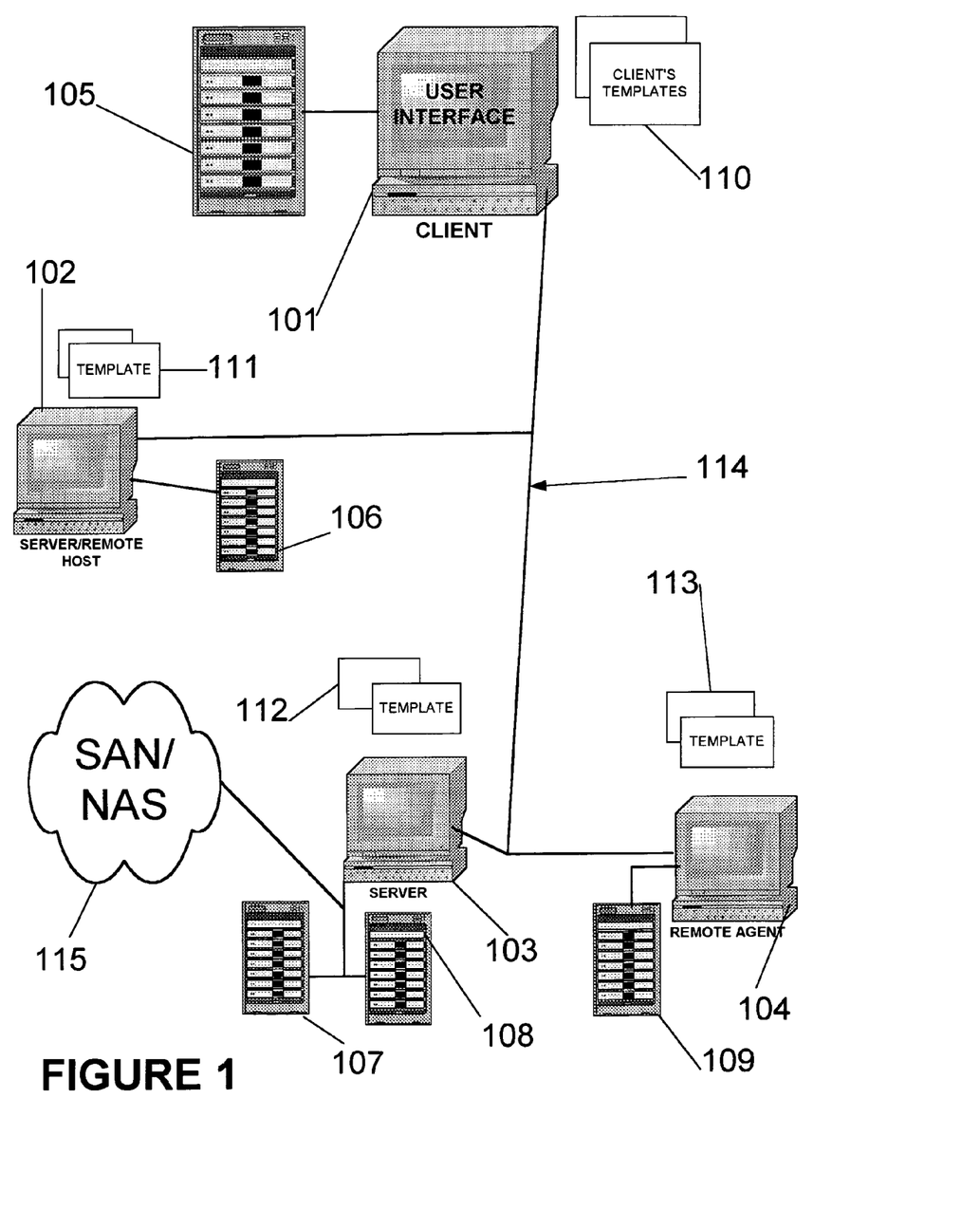
FIG. 1 is a block diagram of a network of the type for which the present invention would provide enhanced reliability.

Prior to discussion of FIG. 1, it should be understood that certain terms herein are used interchangeably. The terms client, head-end station, head station or work-station all refer to the same section of a computer network having a terminal typically with keyboard and mouse interface (collectively, user interface) and local storage (local database or client database), such section being in charge of, in control of, the head of, or the client demanding service from, the remainder of its network or system. And, the terms server, server location, host, agent, remote agent all refer to other section(s) of the network each including processing, storage and other peripheral functions responding to commands from the client and serving the client in response to those commands. A template is a software object or container, which holds data structures, commands, and other binary information, and which is capable of user manipulation or configuration at the location of the user interface. The template holds specific binary information pertaining to: (1) screen displays for the user interface such as dialog boxes, check boxes, etc.; and/or (2) substantive content on, or information contained within or represented by, such screen displays including at a minimum: (a) different kinds of events; (b) varying severity of the different kinds of events; and, (c) various kinds of responses to each of the various event occurrences. The templates or portions of binary information contributing to such templates are deployable or assignable throughout the network by the user at the user interface which is capable of being situated at one location in the network. The user-interface is that connective boundary between the human-user and the computer system, typically conceived as the client terminal's screen with keyboard/mouse interaction. In a client server network, whether or not included in or with a SAN or NAS environment, the client and its servers including communication therebetween and client-control thereover comprise a system, with such servers and their respective processors and storage being sub-system components therein. Peripheral cluster includes such storage and any other peripheral devices under control of its respective server.

FIG. 1

Referring to FIG. 1, a block diagram is shown of a client-server network of the type for which the present invention would provide enhanced reliability. Client (or head station) 101 presents a user interface (UI) for a user of the network via its terminal screen and keyboard at a single point of control in the network. Typical computer system dialog, edit, and check boxes, etc. are presented on the screen which the user can configure and with which the user can interact, and about which more will be discussed in connection with FIG. 8 hereinbelow. Additional screen shots (screen display facsimiles) and other relevant information is published in "EMC Navisphere Event Monitor Version 4.X USER GUIDE P/N 069000970-00" having 122 pages, printed by EMC Corporation, Hopkinton, Mass., October, 2000, and incorporated herein by reference in its entirety. Storage device or disk array 105 is operatively coupled to client 101 and contains at least the client's database. Client or user templates 110 are shown associated with client 101. They are software objects which are stored in storage device 105 and subject to user control and deployment throughout the network by way of operation of client 101 with which the user interfaces, as noted. Templates 110 will be discussed in more detail in connection with other figures hereinbelow.

Servers 102, 103, and 104 are shown operatively coupled via network bus 114 from Client 101 in this client-server network. Any or all of these servers can be remotely located at widely-displaced geographical distances from the client or can be located physically near the client. Also, it is to be understood that a vast number of servers (up to 1000 or more) can be connected on any particular network and only three are shown in this Figure for purposes of enhancing clarity of presentation. Server 102 is operatively coupled to disk array or storage device 106; server 103 is operatively coupled to disk arrays or storage devices 107 and 108 as well as to network cloud 115 representing Network Attached Storage (NAS) or Storage Area Network (SAN) environments and designated herein SAN/NAS or NAS/SAN for convenience purposes; and, server 104 is operatively coupled to storage device 109. Server templates 111 are shown associated with server 102 and are stored in storage device 106; server templates 112 are shown associated with server 103 and are stored in storage devices 107 and/or 108 as well as within storage devices (not shown) operating within or associated with NAS/SAN cloud 115; and, server templates 113 are shown associated with server 104 and are stored in storage device 109. These server templates are also software objects and they have been deployed or assigned by client 101 to databases in their respective server-based storage devices. Host or client 101 where the configuration UI software is running maintains a database on its storage device 105 of all server templates used throughout the site or network (in this instance templates 111, 112, and 113). These server templates as well as the client templates are thus also under control of client 101 and will also be discussed in more detail in connection with other figures hereinbelow.

Figure 2:
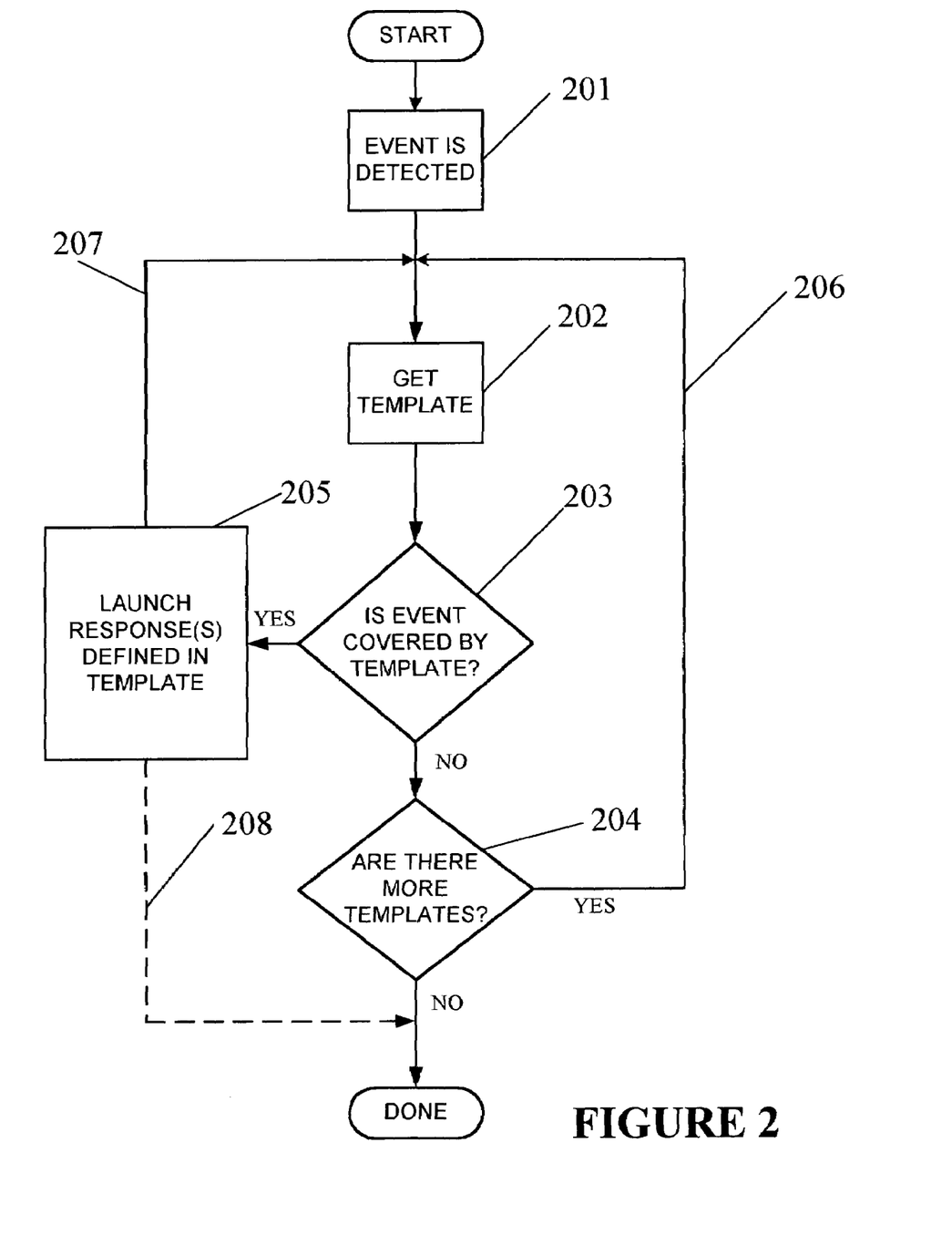
FIG. 2 is a flowchart depicting an algorithm useful with the present invention and associated with use of a template object by a server to process events and notify the user.

FIG. 2—Server Activity

Referring to FIG. 2, a flowchart is presented which depicts an algorithm useful with aspects of the present invention and which is associated with use of a template software object in a client-server network by its server to process events and notify the user of those events. The algorithmic process starts with block 201 which represents the step by which such event is detected. This event could be, for example, a failure in a disk drive, such as a fan failure, fuse failure, etc. The algorithmic process moves next to block 202 where a template stored in the database associated with that server is obtained (e.g. in FIG. 1, template 111 from the database stored within storage device 106 associated with server 102). The algorithmic process moves next to decision block 203 where it is determined if the detected event is covered by that obtained template. On the one hand, if that event is covered by such template, then the algorithmic process moves to block 205 representing steps to be taken to launch responses defined in the template. Such notification option responses could include, for example, the sending of an email to a particular email address or addresses advising of the particular component failure; in lieu of, or in addition to, such email response(s) another response, for example, could be to send a pager alert to page an individual or group of individuals. These notification options thus result in template options. Other responses including "specials" designed by the user such as, for example, robot intervention, substituted components, etc. could be employed. Presumably, such notifications of the occurrence of this event would bring about human reactions whereby such event would be handled or managed in a manner to mitigate any potential network-disaster ramifications. On the other hand, if such event is not covered by the obtained template, the algorithmic process moves to decision block 204 whereby a determination is made regarding the existence of any more templates in this particular server's database. If "yes, there are more templates" then the algorithmic process returns via line 206 to block 202 to obtain a heretofore "unobtained" (for this particular event examination subroutine) template which is then examined in block 203 as before to see if it covers the event and processed as described above. But, if "no, there are not any more templates", then the process is "done", as there are no more templates to examine.

Returning this discussion to block 205, after the responses to this particular event such as email and/or paging are launched, the algorithmic process returns to block 202 via line 207 to determine if such event is also covered by any other templates in that server's database by iteratively cycling through blocks 202, 203, and 204 until it is determined that there are no more templates covering such particular event. As an alternative embodiment, after the responses are launched in accordance with block 205, the algorithmic process at block 205 need not move via line 207 to block 202, but instead could move via line 208 to "done", where it is assumed in this alternative embodiment that there are no other templates covering such event in that server's database.

Figure 3:
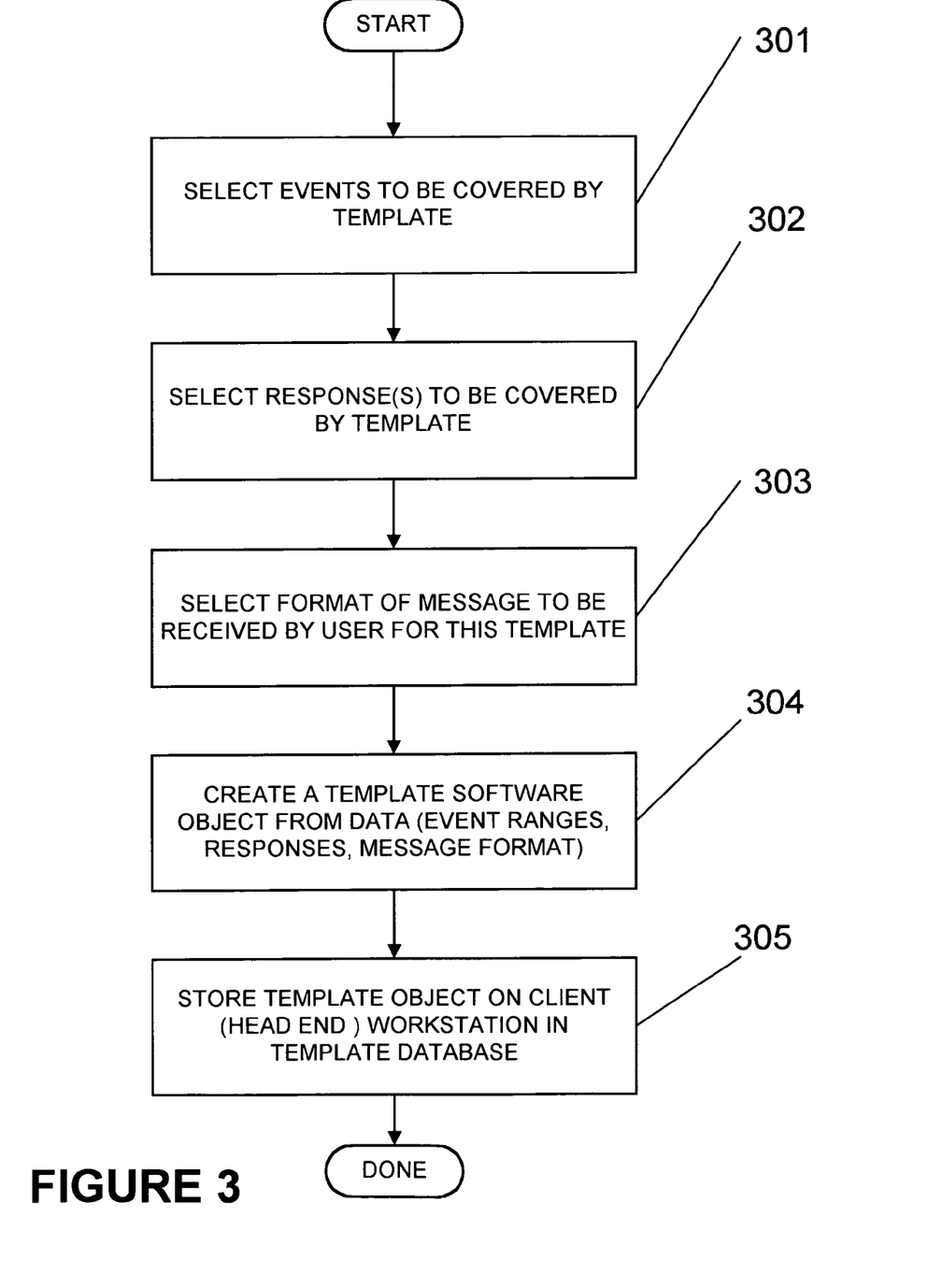
FIG. 3 is a flowchart depicting an algorithm useful with the present invention and associated with the user-interface at the client creating a template object.

FIG. 3—Creating a Template

Next, referring to FIG. 3, a flowchart is presented depicting an algorithm useful with aspects of the present invention and associated with creating a template software object at the client or head-end station by way of the user-interface.

In block or step 301, events of interest are selected or chosen to be covered by the template. In other words, the user determines which particular events, are to be monitored, whether they be full failure events, or degraded operating condition events, or other events. This determination can vary from template-to-template depending on which particular server-storage subsystem in the network is being targeted for monitoring. Certain subsystems may have a propensity for certain degradation or failure modes as opposed to others. These selections are made at a single point or location in the network by the usual point-and-click technique at the user interface, about which more detail will be provided in connection with FIG. 8.

The algorithmic process moves next to step or block 302 wherein the next selection is made—selection of responses desired when events selected in block 301 are detected. All responses for all events can be identical, e.g., selection of only email responses for any detected event. Or, each response can be tailored for each event, e.g., email responses for fan failures sent to first service personnel, and pager responses for ac power failures sent to second service personnel, etc. Again, these response selections are programmed into the system via the user interface, at a single point of contact in the network, where all of these response selections can be conveniently planned at time of their creation for subsequent deployment. For example, two different templates can be conveniently and serially created by a user at a single point in the network at the head-end station for covering identical events occurring at two different server subsystems located in very different regions of the country, where each subsystem would be better serviced by signaling a different response tailored to their different regional locations, with the user's advance knowledge that either or both of these different templates can be deployed or assigned to these different server locations at separate times and when desired. Of course, it is conceivable that this convenient template creation activity can be expanded to hundreds or even thousands of templates, each being conveniently created slightly differently from others for optimization purposes for usage at hundreds or even thousands of different server locations respectively.

The algorithmic process next moves to step 303 where format of the message or response to be received by the user is selected. Format is associated with how the message would look or sound, depending on the nature of the response. In an email, for example, look or layout of the message in the email can be textual or can be pictorial if documents are attached, etc. In an audio response, if a telephone message is generated as the response, the verbally-provided explanation can take various forms including, e.g., different background music or sound styles suggestive of different levels of severity of the problem being reported. A different format can not only be selected for each template, but can also be selected for each response within the same category of responses within the same template. For example, for the email category of responses, there can be a different kind of email format selected for each different kind of event within one particular template used with a single server subsystem having one or more disk drive systems operatively coupled thereto. For example, emphasis such as capitalized letters, boldface or italicized text, or frames or borders around certain text can be provided.

Next, in step 304, the template software object is created from data generated in steps 301, 302, and 303, i.e., the template is constructed at the user interface from selected (or ranges of) events, selected (or ranges of) responses, and selected (or ranges of) message formats. The template is written to the client's diskdrive, where it is stored, e.g., diskdrive 105 associated with client 101 of FIG. 1. This allows the user to shut-down the client computer, or head-station, without needing to recreate the template. Templates created and stored in the hard-drive will be permanently available for future deployment as the network expands or changes. Thus a database or repertoire of many templates for different requirements can be built-up in advance and stored on the head-station disk drive. Accordingly, tremendous flexibility is available to the user in that these templates can be tailored for particular circumstances, and for varying circumstances: e.g. a template which requests paging responses for weekdays can switch to requesting email responses over the weekends and holidays! Other templates can be created to run virtually any user program as a response to an event, where the user program could fail-over to another machine offering redundancy in the network; alternatively, the user program could attempt to fix the problem associated with the detected event, even sending a robot to the rescue in certain classes of failures, such as removing and replacing a broken disk drive!

Figure 4:
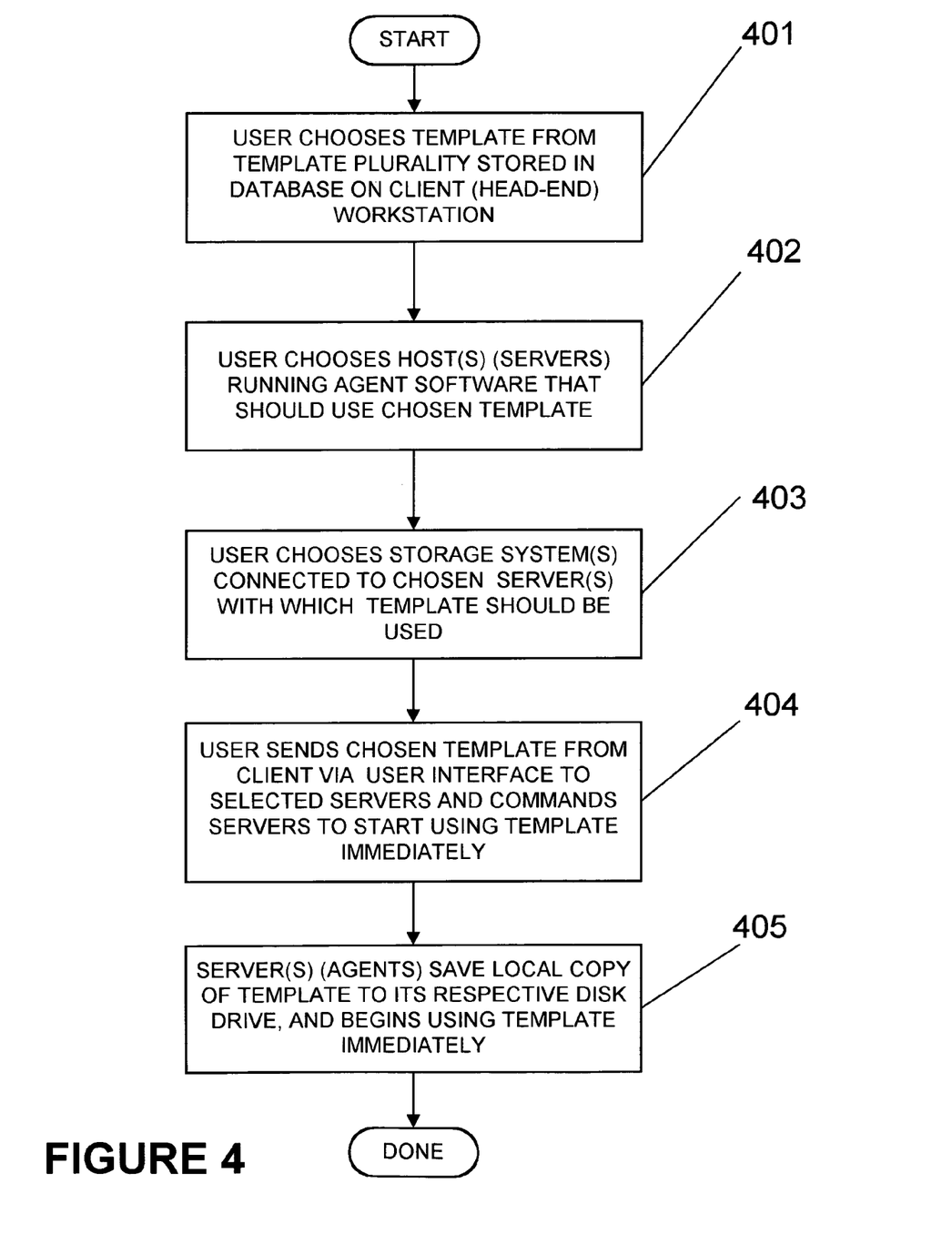
FIG. 4 is a flowchart depicting an algorithm useful with the present invention and associated with the user-interface at the client applying a created template-object to specific server(s) in the network.

FIG. 4—Applying a Template

After a template(s) is created by the user as discussed relative to FIG. 3, it has to be properly deployed or applied at specific locations throughout the network as desired by that user. Accordingly, referring next to FIG. 4, a flowchart is presented depicting an algorithm useful with aspects of the present invention and associated with asserting, or controlling application of, a created template-object to specific server(s) in the network from the user-interface located at the client or host-station. The algorithm starts with step or block 401 where the user at the user interface (using the point/click technique on the appropriate dialog box on the terminal screen, to be discussed further hereinbelow) chooses a particular template from a group of templates that had been created in accordance with FIG. 3, and stored in the client's database, e.g., in storage device 105 of FIG. 1. This selection is made based on user's knowledge of what kinds of events, what kinds of severity levels for each of those events, and what kinds of responses have been designed-into this particular template.

Next, in step 402, the user chooses the particular host (server) or hosts running agent software that are to be monitored by this template, by, e.g., pointing/clicking on a tree display in an event configuration dialog box displayed on the terminal screen at the user-interface. Further detail about this user interface operation will be discussed hereinbelow in connection with FIG. 8. Next, in step 403 the user chooses certain storage system(s) operatively coupled to the particular host(s)/server(s) upon which the user wants this particular template to be asserted or applied. In other words, there may be multiple storage systems as, for example, disk drives 107 and 108 or others (not shown) associated with SAN/NAS cloud 115 connected to host/server 103 in FIG. 1, where a template could be applied to only disk drive 107 and not disk drive 108, or vice-versa, or only to certain others associated with cloud 115 and neither 107 nor 108.

In step 404, user forwards the template chosen in step 401 to the server subsystem (remote agent) associated with the storage system(s) selected in step 403. For example, in FIG. 1, one of the templates shown in group 110 would be sent to host 103 for application to one of the disk drives 107 or 108 or connected with cloud 115. Also, in step 404 the server or host associated with the selected storage system(s), e.g. host 103, and the selected storage system, e.g. disk drive 107, are commanded to start using the forwarded template immediately. In step 405 the remote agent saves a local copy of the forwarded template on its relevant disk drive and starts using the template immediately, and the algorithm is then "done".

Figure 5:
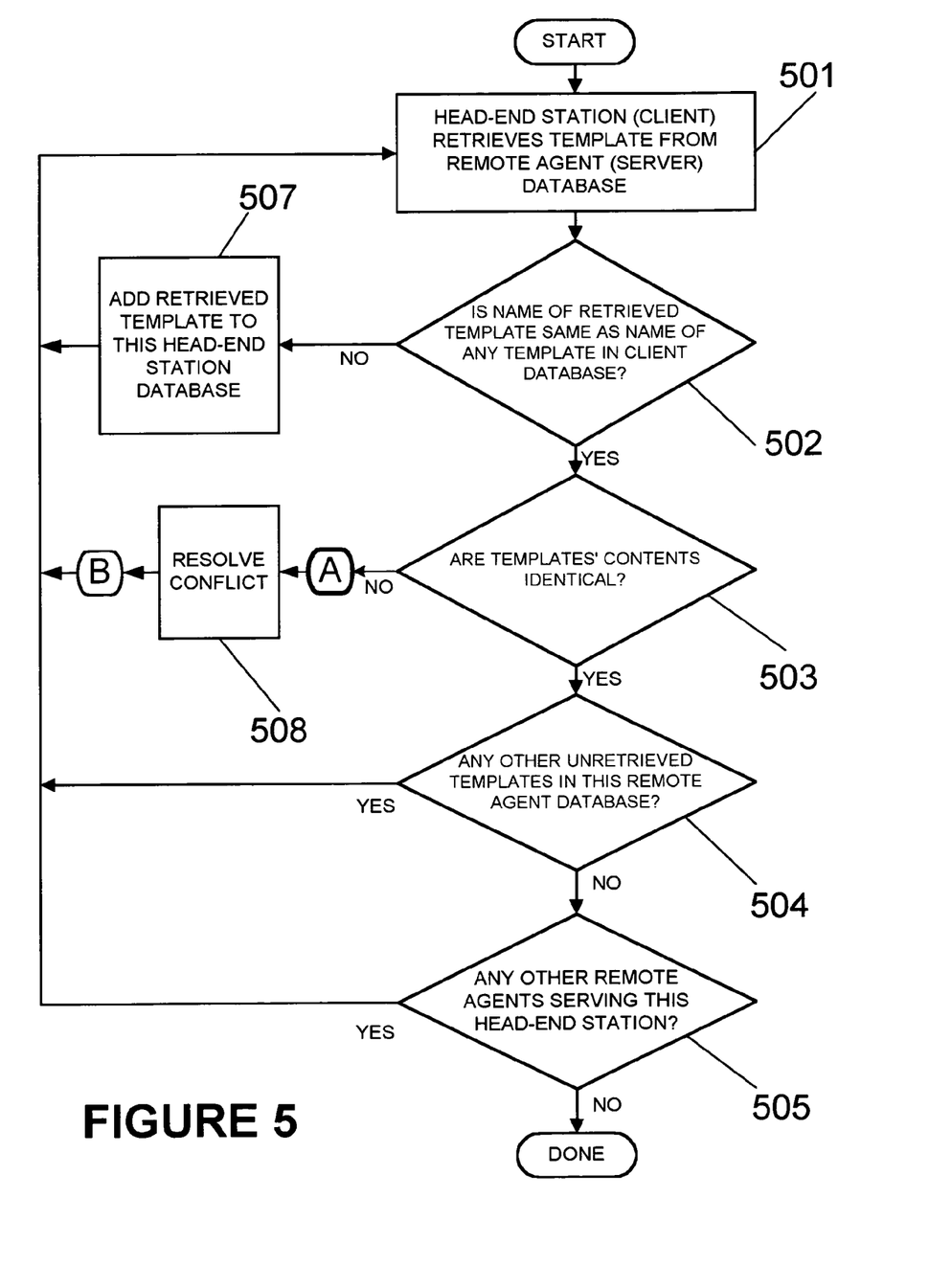
FIG. 5 is a flowchart depicting an algorithm of an aspect of the present invention associated with synchronizing between, or purging ambiguity of, pre-existing template-object contents and template-object names on the one hand and newly-retrieved template-object contents and template-object names on the other hand.

FIG. 5—Purging Template Ambiguity

The foregoing algorithms and discussion thereof set forth essentials of operation of an events-notification scheme with which certain embodiments of the present invention, involving template-calibration or template-synchronization or template-ambiguity-purging, are particularly useful. These embodiments ensure against multiple templates with the same name having different contents, which, if not corrected are erroneous conditions which can negatively impact operation of the events-notification scheme. Referring to FIG. 5, a flowchart depicts an algorithm of an aspect of the present invention associated with purging ambiguity in a situation where pre-existing server template-object content has a certain name and different pre-existing or newly-retrieved client template-object content has the same certain name. The algorithm starts with step 501 where the head-end station (client) retrieves a particular pre-existing template from a particular database maintained on a particular storage device associated with a particular server-host, such as, for example, template 113 from a database maintained on storage device 109 associated with host 104 in FIG. 1. (Such particular template could have been located on a storage device associated with a host (not shown) within or related to cloud 115 of FIG. 1.) After retrieval is accomplished, the algorithmic process moves to decision block 502 wherein a comparison is made between the name of this retrieved pre-existing server template and the name of every template in this head-end station database. If the name is not the same the algorithmic process moves to block 507 wherein the retrieved template is added to this head-end database. Block 507 is returned to the start of block 501 where the next template is retrieved. But, if the name of the retrieved pre-existing template was the same as, or identical to, the name of any template in the head-end station then the algorithmic process would have moved to decision block 503. In block 503, a decision block, the two identically-named templates' contents are compared and if the contents are not identical the process moves to block 508. In block 508 the conflict is resolved and the process moves from there back to the beginning at block 501. The input to and output from block 508 are tabbed "A" and "B" respectively to coordinate with FIG. 6 which is a subroutine comprising block 508 and about which more discussion will take place hereinbelow.

However, if the two identically-named templates' contents are identical then the process moves to decision block 504 wherein the query is posed: are there any other unretrieved templates in this remote agent database (in the database on the disk drive associated with the server/host)? If "yes" then the algorithmic process loops back to "start", is repeated, and continues to loop back until all other unretrieved templates (step 504) in this disk drive are retrieved; if "no" the process moves to block 505.

At this point in the algorithm of FIG. 5, all pre-existing templates stored in this particular remote agent database have been compared with all pre-existing (if any) and newly-retrieved templates stored in the client database, and all ambiguities, if any, regarding names and contents of templates for this particular remote agent database have been resolved. However, there may be other remote agents serving this head end station, as, for example, consider the three remote agents 102, 103, and 104 of FIG. 1 where only one had been compared and cleared. Accordingly, the algorithmic process moves next to block 505 wherein the query is posed: are there any other remote agents serving this head-end station? If yes, then the entire algorithmic process from "start" up to this point is repeated as depicted; but, if "no", then the process is "done".

Figure 6:
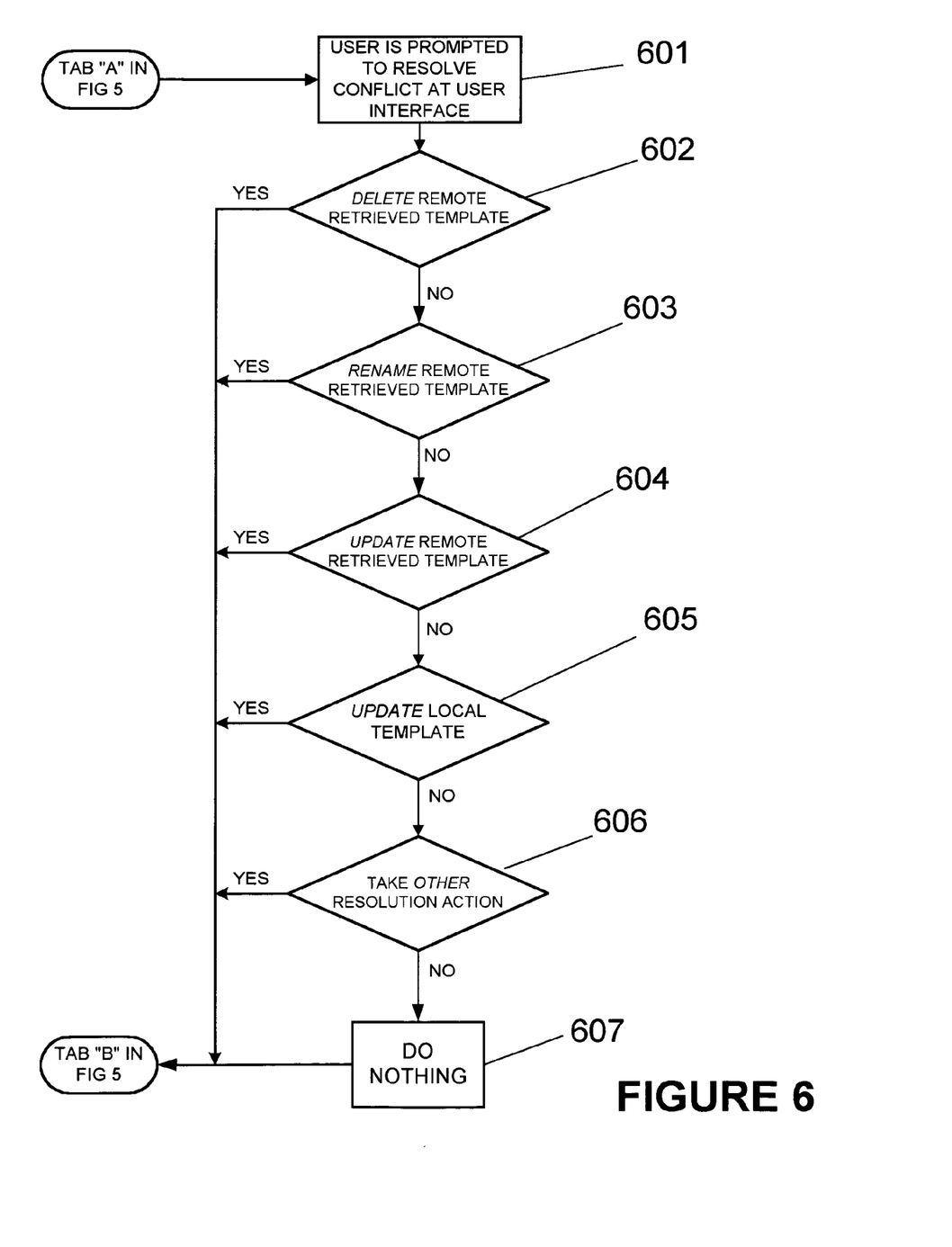
FIG. 6 is a flowchart depicting an algorithm of an aspect of the present invention associated with resolving any conflicts in template-object names and contents uncovered through use of the algorithm depicted in FIG. 5.

FIG. 6—Template Name/Contents Conflict Resolution

Referring to FIG. 6, a flowchart depicts an algorithm of another aspect or further feature of the present invention associated with resolving any conflicts between template-object names and contents uncovered through use of the algorithm of FIG. 5. The "A" tab at "start" and the "B" tab at "done" indicates that this flowchart fits within the "A" and "B" tabs of FIG. 5. Block 601 refers to the step where the user is prompted to resolve, at the user interface, a conflict between name and contents in two templates. Decision block 602 allows the user to delete the conflicting retrieved template; if deleted by the user the procedure is "done". If not deleted, the procedure moves to decision block 603 which allows the user to rename the conflicting retrieved template; if renamed by the user the procedure is "done". If not renamed, the procedure then moves to decision block 604 which allows the user to update the remote server's copy of the conflicting retrieved template with the contents of the client's template; if updated the procedure is "done". If not updated the procedure then moves to decision block 605 which allows or requires a different user to update a local template on a different client about which more will be explained in connection with FIG. 7 hereinbelow. If not updated the procedure then moves to block 606 generically entitled "take other resolution action". Block 606 refers to "special" resolution action, such as, for example, running user's software to generate a fix or bringing in a robot to perform a robotic activity. If such special action is taken the procedure is "done". If no special action taken, the procedure moves to "do nothing" block 607 and the procedure is "done".

Circumstances under which a user might prefer delete to the other actions could be where he/she does not want the template to be present any longer; another template can be added at a later time. Circumstances under which a user might prefer rename to the other actions could be where the user wants the template contents on the remote host to remain as they are, but needs to resolve the naming conflict, where the action of merely renaming the remote host template accomplishes this goal. Circumstances under which a user might prefer update to the other actions could be the most common case, where the user wants to update the template of the same name with the contents of the client's database. And, circumstances under which a user might prefer other resolution action could be where none of the foregoing choices are desirable or where another special choice available to a particular user is an optimum choice under the then circumstances of that particular user.

Figure 7:
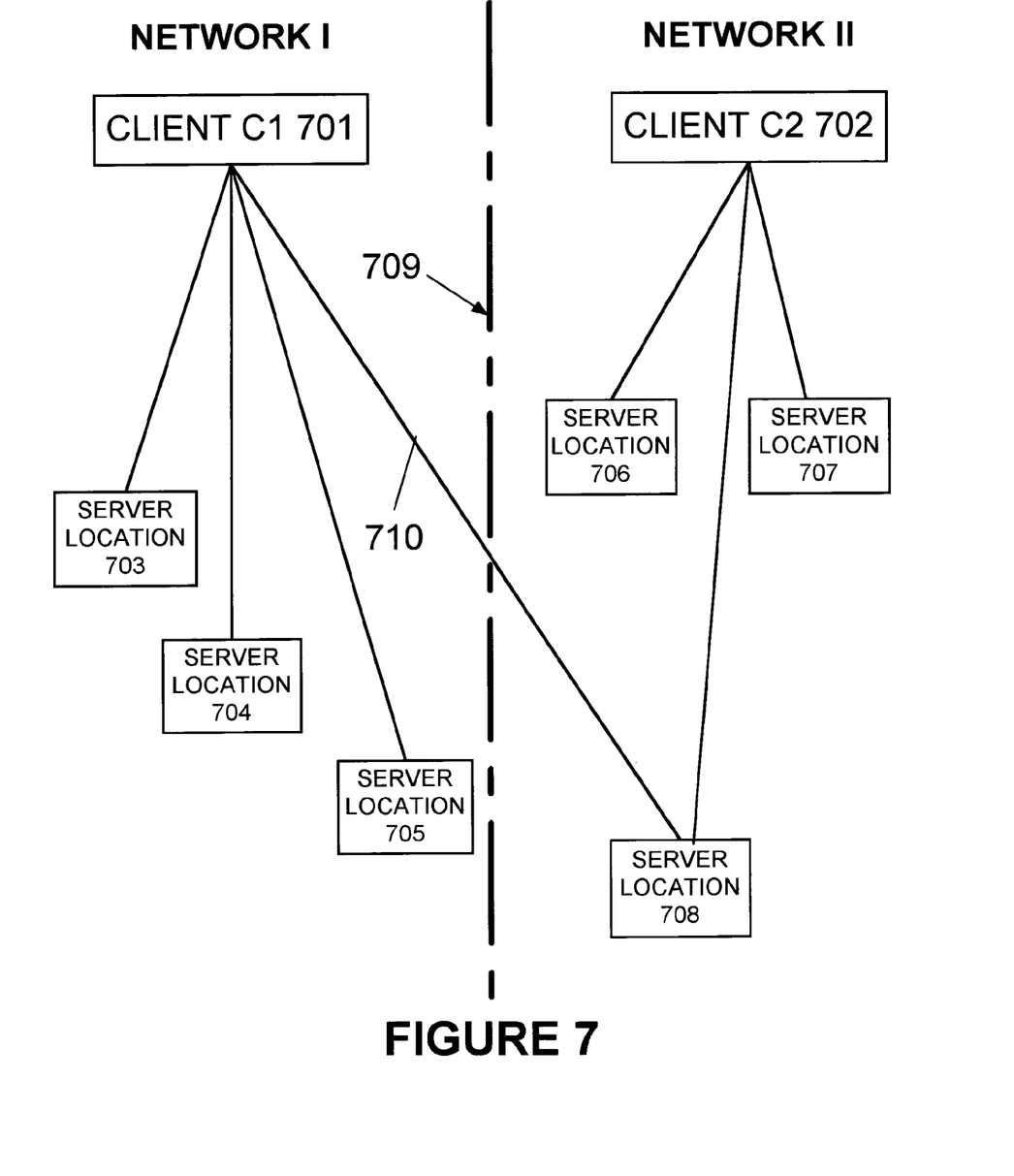
FIG. 7 is a block diagram of an alternative embodiment of the present invention wherein features of enhanced reliability provided thereby are applied to multiple clients sharing one or more common servers; and, FIG. 8 is a facsimile of a dialog box of the type that could be employed within the present invention at the user interface.

FIG. 7—Alternative Embodiment—Multiple Clients

Finally, there could be a network scenario where there are separate networks each having their own segregated clients and servers, but where one or more servers from one or more other networks, for some reason, have been arranged to interact with the above-noted client of this network. Referring to FIG. 7, this scenario is presented in a block diagram. The above-noted client C1 701 (equivalent to Client 101 of FIG. 1) is shown operatively networked to server-database combinations or server-locations 703, 704, and 705 (for purposes of simplification, these three singular blocks should be viewed as combining the functions of server, database, and template as represented separately in FIG. 1). Components 701, 703, 704, and 705 comprise network I, as shown, which is separated from network II by imaginary demarcation line 709. (Many more networks which could have been shown with many servers per network are not shown to enhance clarity of presentation.) Network II comprises different client C2 702 which is operatively coupled to its server-database combinations 706, 707, and 708 (to be viewed similarly to 703, 704, and 705). The cross-network connection 710 shows that above-noted client 701 is operatively coupled out of its normal network to server 708. In this instance if there is a conflict between names and contents of templates stored on databases associated with server 708 and client 701, client 701 updates conflicting templates stored on databases in server 708 conform to its own templates. In such a case, such updated templates in server 708 are also changed relative to expectations of other client C2 702. However, an assumption is made that Client C1 is operating with new data and Client C2 is operating with old or obsolete data. In other words, the most current event-notification-establishment-user can over-ride template names or contents for templates stored in databases of servers that are common to itself and other clients. Thus if client C2 702 had established its event-notification parameters earlier than the establishing of event-notification parameters for client C1 701, then any client C1 701 templates imposed on databases associated with server 706 in Network II shall be further imposed on Client C2 702 as being the "latest" or "most preferred" event response or template. This is summarized in decision block 605 of FIG. 6 as an action to resolve conflict by "update local template", which means, in terms of the example and scenario used herein, to update the local template in client C2 702.

Figure 8:
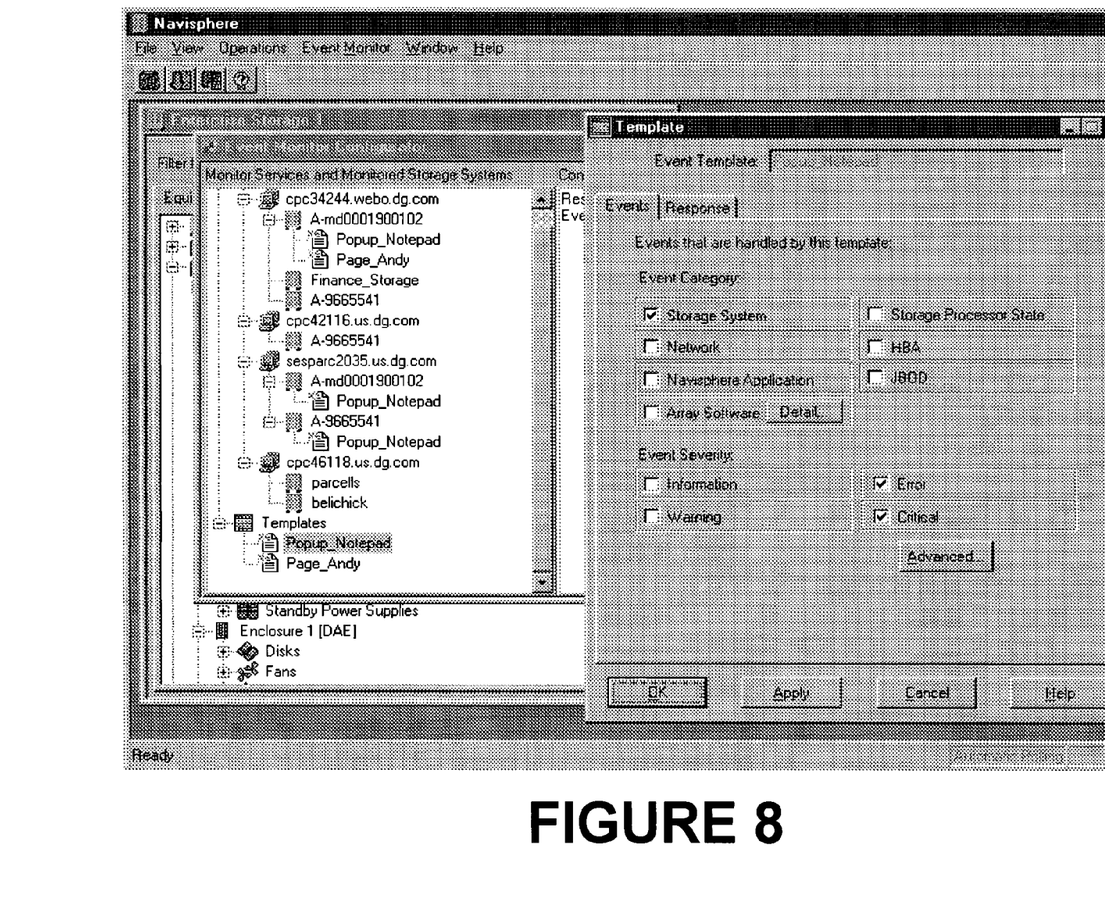

FIG. 8—Template Property Dialog Box

FIG. 8 is a facsimile of a dialog box, entitled "Template", of the type that could be utilized within disclosed embodiments of the present invention. (In FIG. 1, client's templates 110 include dialog boxes such as the one shown in FIG. 8.) This dialog box and other similar graphical user interface boxes and icons with their responsiveness to "point and click" of the mouse and to inputs from the keyboard are essentials of the aforementioned "user interface". In other words, the present invention provides device management software which runs on various computer systems and which offers a user the convenience of selecting, at a single point in the network, various devices to monitor, the manner by which monitored events shall be reported, to whom such reports shall be sent, and other related activities. All of this control and management is achieved by the user interacting with various screen presentations generated by such software. For example, in the right hand portion of FIG. 8 "Event Category" is offered by way of checkboxes, and "storage system" is shown checked in the Figure, which was achieved by pointing to and clicking on that particular checkbox with the mouse associated with this client's terminal. Other event category checkboxes shown are "network", "navisphere application", "array software", "storage processor state", "HBA" (host bus adapter), and "JBOD" (just bunch of disks). Also shown below the Event Category is another section of checkboxes entitled "Event Severity". There are four check boxes and two are shown as checked: "Error" and Critical" are checked, and "Information" and "Warning" are shown unchecked. In this manner a particular user, being interested in events of only a particular severity, can control number of notifications received about events associated with a particular piece of hardware. In this example, hardware involved is the checked "storage system" shown under the event category and the only notifications received will necessarily meet the standard of "error" and "critical" in accordance with their checked boxes. Thus other errors that rise only to the level of "warning" or "information" will not be forwarded to the user.

As is to be understood, FIG. 8 depicts a "windows" type of screen display, and a portion of a window underlying the "Template" dialog box, entitled "Event Monitor Configurator" is shown at the left-hand side of the Fig. It can be seen that the Configurator shows a "tree" presentation of servers with their associated storage devices as well as a tree presentation of templates with their respective event response directives. The rest of the nomenclature shown in that view and in the view of another window underlying that view is nothing more than typical information that could be so displayed, and it has no further relevance to operation of the present invention. In the usual fashion when dealing with Microsoft Windows styled software, the underlying Event Monitor Configurator can be brought to the top of the window pile and available icons can be selected by point and click techniques to allow the user to select amongst the servers and their respective storage systems and to choose templates and responses as noted.

It is to be understood that this singular screen display facsimile is intended to represent the concept of providing the user with a multiplicity of similar displays of various types having various modes of interaction (such as edit boxes, radio buttons, checkboxes, clickable icons, tabs, control buttons, etc.) that would be made available by running the software of the present invention. Such additional screen displays are not included as they would not further enhance clarity of presentation of the present invention. However, the incorporated-by-reference "EMC Navisphere Event Monitor Version 4.X User Guide" offers additional screen shots (screen display facsimiles) and other information which are useable and useful at the user interface in connection with operation of the present invention. Software of the present invention has been implemented in C++ programming language. Alternatively, other programming languages are suitable for use in implementing the various embodiments of the present invention and they include C, JAVA, assembly language, etc.

Various embodiments of the present invention are to be considered in all respects as illustrative and not restrictive. Other algorithmic schemes may be employed to accomplish the various aspects of the present invention. For example, in FIG. 5, all templates could be retrieved simultaneously as opposed to the sequential operation shown. In FIG. 6, fewer or more choices could be provided for the user, or these actions could be selected automatically without involving user choice. In FIG. 7, more clients could be included and more interconnections between and amongst clients from one network to servers from another network could be made than only those that are shown. And, embodiments of the present invention are readily applicable to the SAN (Storage Area Network) environment, the NAS (Network Attached Storage) environment, as well as the Client-Server environment. Scope and breadth of the invention is indicated, therefore, by the appended claims rather than by the foregoing description, and all changes which come within the meaning and range of equivalency of the claims are therefore intended to be embraced therein.

What is claimed is:

1. In a computer network having an events notification system, said network including at least one client having a client-database, at least one server having at least one server-database, said at least one client: (1) selecting said events and desired notification responses thereto to obtain selected data, (2) creating a plurality of event-notification template objects from said selected data and storing said objects in said client database; and, (3) transmitting said objects from said client database to selected ones of said at least one server to obtain server-database event notification template objects and commanding immediate usage of said server-database template objects by said at least one server, an improved method to maintain operating integrity of said network, said improvement comprising:

said at least one client ensuring that any pre-existing said server database template objects and any of said plurality of template objects which are identically-named contain identical object data;

wherein said ensuring comprises said client:

retrieving said any pre-existing said server-database template objects and comparing each of the names of said any pre-existing template objects with each of the names of said plurality of template objects stored in said client-database;

adding new templates comprising pre-existing object data associated with any of said names of said any pre-existing template objects that do not match said names of said plurality of template objects, to said client database; and, resolving any conflict between any said any pre-existing said server-database template objects and any of said plurality of template objects having identical names but having said pre-existing object data different from said object data.

2. The method of claim 1 and wherein said resolving is selected from the group consisting of: deleting said server-stored template objects, renaming said server-stored template objects, and updating said server-stored template objects.

3. The method of claim 1 and further including repeating said ensuring acts of claim 1 for all said any pre-existing and server-database template objects.

4. In a computer network, said network including at least one client having a client-database, at least one server having at least one server-database, said at least one client: (1) selecting events and desired notification responses thereto to obtain selected data, (2) creating a plurality of event-notification template objects from said selected data and storing said objects in said client database; and, (3) transmitting said objects from said client database to selected ones of said at least one server to obtain server-database event notification template objects and commanding immediate usage of said server-database template objects by said at least one server, an improved method for establishing an events notification system, said improvement comprising:

said at least one client ensuring that any pre-existing said server database template objects and any of said plurality of template objects which are identically-named contain identical object data;

wherein said ensuring comprises said client:

retrieving said any pre-existing said server-database template objects and comparing each of the names of said any pre-existing template objects with each of the names of said plurality of template objects stored in said client-database;

adding new templates comprising pre-existing object data associated with any of said names of said any pre-existing template objects that do not match said names of said plurality of template objects, to said client database; and, resolving any conflict between any said any pre-existing said server-database template objects and any of said plurality of template objects having identical names but having said pre-existing object data different from said object data.

5. The method of claim 4 and wherein said resolving is selected from the group consisting of: deleting said server-stored template objects, renaming said server-stored template objects, and updating said server-stored template objects.

6. The method of claim 4 and further including repeating acts of claim 4 for all said any pre-existing and server-database template objects.

7. In a computer network having an events notification system, said network including at least one client having a client-database, at least one server having at least one server-database, said at least one client: (1) selecting said events and desired notification responses thereto to obtain selected data, (2) creating a plurality of event-notification template objects from said selected data and storing said objects in said client database; and, (3) transmitting said objects from said client database to selected ones of said at least one server to obtain server-database event notification template objects and commanding immediate usage of said server-database template objects by said at least one server, improved apparatus to maintain operating integrity of said network, said improvement comprising:

said client including means for ensuring that any pre-existing said server database template objects and any of said plurality of template objects which are identically-named contain identical object data;

wherein said means for ensuring comprises:

means for retrieving said any pre-existing said server-database template objects and comparing each of the names of said any pre-existing template objects with each of the names of said plurality of template objects stored in said client-database:

means for adding new templates comprising pre-existing object data associated with any of said names of said any pre-existing template objects that do not match said names of said plurality of template objects, to said client database; and, means for resolving any conflict between any said any pre-existing said server-database template objects and any of said plurality of template objects having identical names but having said pre-existing object data different from said object data.

8. The apparatus of claim 7 and wherein said means for resolving is selected from the group consisting of: deleting said server-stored template objects, renaming said server-stored template objects, and updating said server-stored template objects.

9. The apparatus of claim 7 and further including means for repeating acts of said ensuring of claim 7 for all said any pre-existing and server-database template objects.

10. In a computer network, said network including at least one client having a client-database, at least one server having at least one server-database, said at least one client employing an events notification system for: (1) selecting said events and desired notification responses thereto to obtain selected data, (2) creating a plurality of event-notification template objects from said selected data and storing said objects in said client database; and, (3) transmitting said objects from said client database to selected ones of said at least one server to obtain server-database event notification template objects and commanding immediate usage of said server-database template objects by said at least one server, an improved computer program product for use with said events notification system, said improvement comprising:

programmable code, executed by said client, for ensuring that any pre-existing said server database template objects and any of said plurality of template objects which are identically-named contain identical object data;

wherein said programmable code for ensuring comprises:

programmable code for retrieving said any pre-existing said server-database template objects and comparing each of the names of said any pre-existing template objects with each of the names of said plurality of template objects stored in said client-database;

programmable code for adding to said client database new templates comprising pre-existing object data associated with any of said names of said any pre-existing template objects that do not match said names of said plurality of template objects; and, programmable code for resolving any conflict between any said any pre-existing said server-database template objects and any of said plurality of template objects having identical names but having said pre-existing object data different from said object data.

11. The computer program product of claim 10 and wherein said programmable code for resolving is selected from the group consisting of: programmable code for deleting said server-stored template objects, programmable code for renaming said server-stored template objects, and programmable code for updating said server-stored template objects.

12. The computer program product of claim 10 and further including programmable code for repeating acts of claim 10 for all said any pre-existing and server-database template objects.

* * * * *